(12) United States Patent
Liu (10) Patent No.: US 12,453,075 B2
(45) Date of Patent: Oct. 21, 2025

(54) WORD LINE STRUCTURE, MANUFACTURING METHOD THEREOF AND SEMICONDUCTOR MEMORY

(71) Applicant: CHANGXIN MEMORY TECHNOLOGIES, INC., Hefei (CN)

(72) Inventor: ChihCheng Liu, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 845 days.

(21) Appl. No.: 17/386,499

(22) Filed: Jul. 27, 2021

(65) Prior Publication Data
US 2021/0358916 A1 Nov. 18, 2021

Related U.S. Application Data

(63) Continuation of application No. PCT/CN2021/079666, filed on Mar. 9, 2021.

(30) Foreign Application Priority Data

Mar. 25, 2020 (CN) .......................... 202010216024.6

(51) Int. Cl.
| | | |
|---|---|---|
| *H01L 27/108* | (2006.01) | |
| *G11C 8/14* | (2006.01) | |
| *H10B 12/00* | (2023.01) | |

(52) U.S. Cl.
CPC ............... *H10B 12/30* (2023.02); *G11C 8/14* (2013.01); *H10B 12/488* (2023.02)

(58) Field of Classification Search
CPC .............................. H10B 12/30; H10B 12/488; H10B 12/00–50; H10B 10/00–18;
(Continued)

(56) References Cited

U.S. PATENT DOCUMENTS 6,097,049 A * 8/2000 Goebel ................ H10B 12/033
257/E21.655
6,188,095 B1 2/2001 Hieke
(Continued)

FOREIGN PATENT DOCUMENTS

CN 1716612 A 1/2006
CN 1815718 A 8/2006
(Continued)

OTHER PUBLICATIONS

Partial Supplementary European Search Report in the European application No. 21774339.2, mailed on Aug. 4, 2022, 12 pgs.
(Continued)

*Primary Examiner* — Dao H Nguyen
(74) *Attorney, Agent, or Firm* — Kilpatrick Townsend & Stockton LLP (57) ABSTRACT

A word line structure, a manufacturing method thereof, and a semiconductor memory are provided. The word line structure includes a first word line array and a second word line array. The first word line array includes a plurality of first word lines extending in an X direction. The first word lines have a same length and are aligned and arranged in a Y direction. The second word line array includes a plurality of second word lines extending in the X direction. The second word lines have a same length and are aligned and arranged in the Y direction. The first word line array and the second word line array are not aligned in the Y direction. The Y direction is perpendicular to the X direction.

15 Claims, 6 Drawing Sheets

(58) Field of Classification Search
CPC ........ H10B 20/40–50; H10B 53/00–50; H10B 41/00–70; H10B 43/20–27; H10B 51/00–50; H10B 63/84–845; H10B 69/00; G11C 8/14; G11C 11/408; G11C 11/41–419; G11C 11/401–4099; G11C 11/5621–5642; G11C 14/0009–0045; G11C 2211/4016; G11C 16/00–349; G11C 2216/06–10; G11C 2216/12–30; H01L 23/538; H01L 23/5386; H01L 2924/1437; H01L 2924/1436–14369; H01L 2924/1451; H01L 27/092–0928; H01L 28/40–92

See application file for complete search history.

(56) References Cited

U.S. PATENT DOCUMENTS

| | | | |
|---|---|---|---|
| 6,278,628 B1* | 8/2001 | Sekiguchi | G11C 5/06 365/230.03 |
| 7,019,353 B2 | 3/2006 | Lindsay | |
| 7,087,947 B2 | 8/2006 | Lee | |
| 7,508,024 B2 | 3/2009 | Lindsay | |
| 7,619,279 B2 | 11/2009 | Lindsay | |
| 8,114,737 B2 | 2/2012 | Lindsay | |
| 8,674,522 B1 | 3/2014 | Pratt | |
| 8,803,228 B2 | 8/2014 | Lindsay | |
| 9,886,996 B2 | 2/2018 | Fujiwara et al. | |
| 10,276,231 B2 | 4/2019 | Fujiwara et al. | |
| 10,770,131 B2 | 9/2020 | Fujiwara et al. | |
| 2003/0235091 A1* | 12/2003 | Sekine | G11C 8/14 365/200 |
| 2004/0016953 A1 | 1/2004 | Lindsay | |
| 2004/0245569 A1 | 12/2004 | Kowalski | |
| 2005/0279984 A1 | 12/2005 | Lindsay | |
| 2005/0279985 A1 | 12/2005 | Lindsay | |
| 2005/0280071 A1 | 12/2005 | Lindsay | |
| 2006/0001074 A1 | 1/2006 | Lindsay | |
| 2006/0077702 A1 | 4/2006 | Sugimae | |
| 2006/0221752 A1* | 10/2006 | Fasoli | G11C 7/18 257/E27.071 |
| 2006/0270102 A1 | 11/2006 | Chang | |
| 2007/0218627 A1* | 9/2007 | Lattard | H10D 89/00 430/394 |
| 2009/0040824 A1 | 2/2009 | Hirohisa | |
| 2010/0035395 A1 | 2/2010 | Lindsay | |
| 2011/0286283 A1 | 11/2011 | Lung | |
| 2012/0127793 A1 | 5/2012 | Lindsay | |
| 2013/0094273 A1 | 4/2013 | Chien | |
| 2016/0163708 A1* | 6/2016 | Jang | G11C 11/4087 257/369 |
| 2016/0351573 A1 | 12/2016 | Yoshino | |
| 2017/0110181 A1 | 4/2017 | Fujiwara et al. | |
| 2018/0158510 A1 | 6/2018 | Fujiwara et al. | |
| 2018/0198059 A1* | 7/2018 | Ko | H01L 23/5226 |
| 2019/0237134 A1 | 8/2019 | Fujiwara et al. | |
| 2019/0244933 A1 | 8/2019 | Or-Bach et al. | |
| 2020/0020702 A1* | 1/2020 | Baek | H10B 41/10 |
| 2020/0350315 A1* | 11/2020 | Son | H10B 12/00 |
| 2020/0372951 A1 | 11/2020 | Fujiwara et al. | |

FOREIGN PATENT DOCUMENTS

| | | | |
|---|---|---|---|
| CN | 103811495 A | | 5/2014 |
| CN | 107017018 A | | 8/2017 |
| CN | 107994018 A | | 5/2018 |
| CN | 207938611 U | * | 10/2018 |
| CN | 109698193 A | | 4/2019 |
| CN | 109952643 A | | 6/2019 |
| CN | 110021599 A | | 7/2019 |
| CN | 110391234 A | | 10/2019 |
| TW | 201419285 A | | 5/2014 |

OTHER PUBLICATIONS

Notice of Allowance of the Chinese application No. 202010216024.6, issued on Jun. 28, 2022, 4 pgs.

International Search Report in the international application No. PCT/CN2021/079666, mailed on Jun. 8, 2021, 2 pgs.

First Office Action of the European application No. 21774339.2, issued on Jun. 1, 2023. 6 pages.

First Office Action of the Chinese application No. 202010216024.6, issued on Jan. 20, 2022, 15 pgs.

Second Office Action of the Chinese application No. 202010216024.6, issued on Apr. 12, 2022, 8 pgs.

Oral Proceedings of the European application No. 21774339.2, issued on Jan. 9, 2024. 14 pages.

* cited by examiner

WORD LINE STRUCTURE, MANUFACTURING METHOD THEREOF AND SEMICONDUCTOR MEMORY

CROSS-REFERENCE TO RELATED APPLICATION

This is a continuation application of International Patent Application No. PCT/CN2021/079666, filed on Mar. 9, 2021, which claims priority to Chinese Patent Application No. 202010216024.6, filed on Mar. 25, 2020, and entitled "Word Line Structure and Semiconductor Memory". The disclosures of the International Patent Application No. PCT/CN2021/079666 and the Chinese Patent Application No. 202010216024.6 are incorporated by reference herein in their entireties.

TECHNICAL FIELD

The disclosure relates to a word line structure, a manufacturing method thereof, and a semiconductor memory.

BACKGROUND

With the development of science and technology, people's requirement for a semiconductor technology is getting higher and higher, and the area of semiconductor devices is continuously reduced. Therefore, higher requirements are put forward for the precision and accuracy of a semiconductor manufacturing process. A semiconductor memory is a memory accessed by using a semiconductor circuit, where a Dynamic Random Access Memory (DRAM) is widely used in various fields with high storage speed and high integration level.

SUMMARY

According to various embodiments, a first aspect of this disclosure provides a word line structure, which may include a first word line array and a second word line array.

The first word line array includes a plurality of first word lines extending in an X direction. The plurality of first word lines may have a same length and be aligned and arranged in a Y direction.

The second word line array includes a plurality of second word lines extending in the X direction. The plurality of second word lines may have a same length and be aligned and arranged in the Y direction.

The first word line array and the second word line array may be not aligned in the Y direction, and the Y direction may be perpendicular to the X direction.

According to various embodiments, a second aspect of this disclosure provides a semiconductor memory, which may include: a word line structure as described above; and a memory cell.

The memory cell includes a memory capacitor and a transistor. A gate of the transistor may be connected to a word line, a drain of the transistor may be connected to a bit line, and a source of the transistor may be connected to the memory capacitor.

A plurality of memory cells may be arranged in an array consisting of M rows and N columns, the memory cells in a same row may share one word line, the memory cells in a same column may share one bit line, the word line may have the word line structure, and both M and N may be positive integers.

According to various embodiments, a third aspect of this disclosure provides a manufacturing method of a word line structure, which may include following operations.

A substrate is provided, in which an isolation structure and an active region may be formed in the substrate.

A hard mask layer is formed on a surface of the substrate.

The hard mask layer is patterned, in which the patterned hard mask layer has a pattern same as a pattern of word lines.

The substrate is etched through the patterned hard mask layer to form word line trenches.

The word line trenches are filled with a conductive material layer, and the conductive material layer is etched so that a top of the conductive material layer is lower than the surface of the substrate and the remaining conductive material layer serves as first word lines and second word lines.

The word line trenches are filled with a dielectric layer, in which the dielectric layer has a top flush with the surface of the substrate. The dielectric layer and the substrate in a set region are etched to the first word line or the second word line to form word line contact grooves for forming first word line contact structures and second word line contact structures. A contact material layer is deposited in the first word line contact groove and the second word line contact groove and on the surface of the substrate, and the contact material layer on the surface of the substrate is removed, in which the remaining contact material layer serves as the first word line contact structures and the second word line contact structures.

The details of one or more embodiments of this disclosure are set forth in the accompanying drawings and the description below. Other features and advantages of this disclosure will be apparent from the specification, the accompanying drawings, and the claims.

BRIEF DESCRIPTION OF THE DRAWINGS

To describe the technical solutions in the embodiments of this disclosure more clearly, the following briefly introduces the accompanying drawings required in the embodiments. It is apparent to those of ordinary skill in the art that the drawings in the following description are only some embodiments of this disclosure, and that other drawings may be obtained from these drawings without involving any inventive effort.

DETAILED DESCRIPTION

A DRAM includes a plurality of repeated memory cells. As the size of the DRAM is continuously reduced and the integration level is continuously improved, the feature size and the unit area of the DRAM are reduced. Therefore, the area of a word line contact structure is correspondingly reduced, so that the contact resistance between the word line contact structure and corresponding word line is increased, which causes current flowing through the word line too small, and therefore the turn-on and turn-off speed of a switch in the memory cell of the DRAM is improved.

For ease of understanding of the disclosure, the disclosure will now be described more fully hereinafter with reference to the related accompanying drawings. Preferred embodiments of the disclosure are illustrated in the accompanying drawings. The disclosure may, however, be embodied in many different forms, and is not be limited to the embodiments set forth herein. Rather, these embodiments are provided so that the disclosure will be more thorough and complete.

Unless defined otherwise, all technical and scientific terms used herein have the same meaning as commonly understood by those skilled in the art to which the disclosure belongs. The terms used herein in the specification of the disclosure are for the purpose of describing particular embodiments only and are not intended to be limiting of the disclosure. As used herein, the term "and/or" includes any and all combinations of one or more of the associated listed items.

Figure 1:
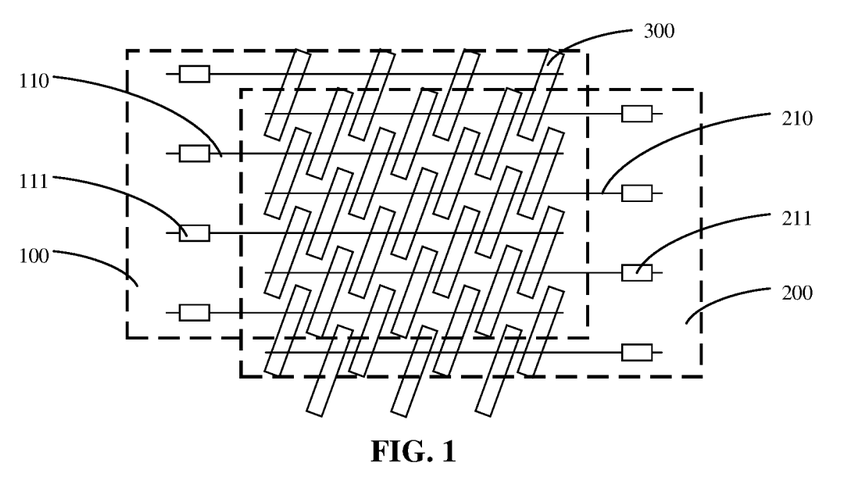
FIG. 1 is a schematic diagram of a word line contact structure according to an embodiment.

FIG. 1 is a schematic diagram of a word line contact structure according to an embodiment. As shown in FIG. 1, a word line structure includes a first word line array 100 and a second word line array 200.

The first word line array 100 includes a plurality of first word lines 110 extending in an X direction. The plurality of first word lines 110 have a same length and are aligned and arranged in a Y direction.

The second word line array 200 includes a plurality of second word lines 210 extending in the X direction. The plurality of second word lines 210 have a same length and are aligned and arranged in the Y direction.

The first word line array 100 and the second word line array 200 are not aligned in the Y direction. The Y direction is perpendicular to the X direction.

The fact that first word line array 100 and the second word line array 200 are not aligned in the Y direction means that the first word line array 100 and the second word line array 200 are in different columns, i.e. a first axis of symmetry of the first word line array 100 extending in the Y direction does not coincide with a second axis of symmetry of the second word line array 200 extending in the Y direction. Specifically, both the first word lines 110 and the second word lines 210 are formed on word line trenches. A plurality of active regions 300 are disposed in a substrate. Each active region 300 is used to form a memory cell. Projections of each first word line 110 and each second word line 210 on the substrate pass through multiple active regions 300. The first word lines 110 and the second word lines 210 are used to control the turn-on and turn-off of transistors of memory cells.

As can be seen from FIG. 1, in the present embodiment, since the first word line array 100 and the second word line array 200 are not aligned in the Y direction, a larger arrangement space is provided for the word line contact structure, so that the cross-sectional area of the word line contact structure can be enlarged, and thus the contact resistance between the word line contact structure and the corresponding word line can be reduced, and the turn-on and turn-off speed of a switch in the memory cell can be improved. Meanwhile, the problem that the contact resistance is increased and even the device fails when the word line contact structure is shifted from the word line in the Y direction is avoided. It needs to be noted that the cross-section in the present embodiment refers to a section parallel to the surface of the substrate, the cross-section in the following embodiment has the same definition as that in the present embodiment, and descriptions thereof are omitted.

Figure 2:
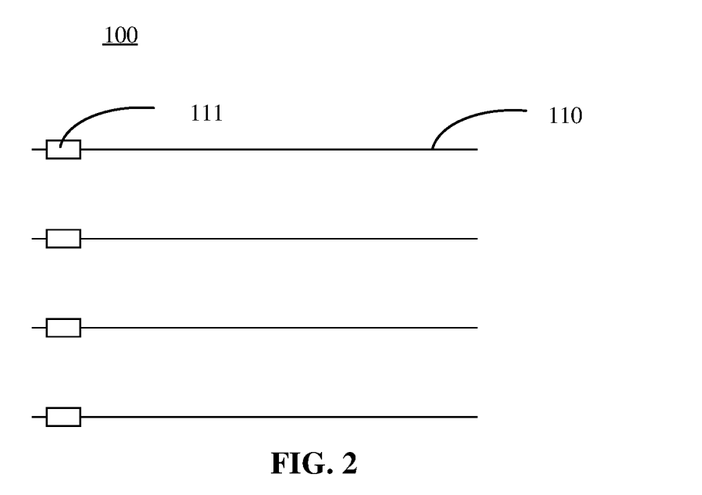
FIG. 2 is a schematic diagram of a first word line array according to an embodiment.
Figure 3:
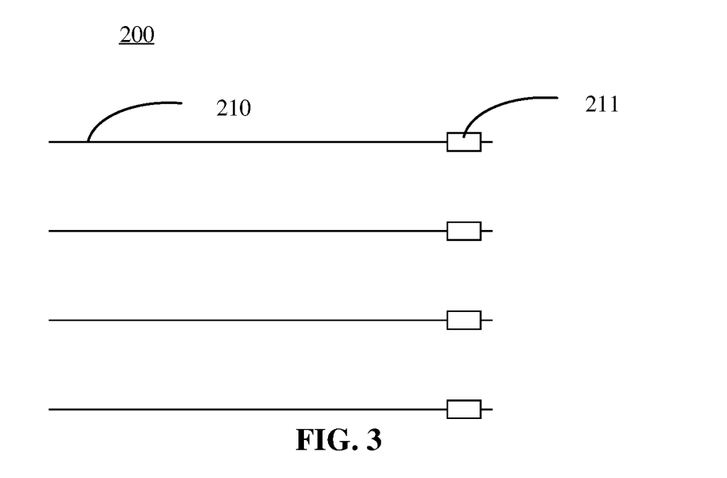
FIG. 3 is a schematic diagram of a second word line array according to an embodiment.

In an embodiment, the plurality of first word lines 110 are equidistantly arranged at a set interval in the Y direction. The plurality of second word lines 210 are equidistantly arranged at a set interval in the Y direction. FIG. 2 is a schematic diagram of a first word line array 100 according to the present embodiment. FIG. 3 is a schematic diagram of a second word line array 200 according to the present embodiment. As shown in FIGS. 2 and 3, providing a plurality of equidistantly arranged first word lines 110 and a plurality of equidistantly arranged second word lines 210 allow the first word lines 110 and the second word lines 210 to be adapted to regularly-aligned active regions. Meanwhile, when the arrangement interval of the first word lines 110 is the same as the arrangement interval of the second word lines 210, the active regions connected to the first word lines 110 and the active regions connected to the second word lines 210 may be more compatibly arranged on the substrate, thereby reducing the design difficulty and the processing difficulty of the active regions, the first word lines 110, and the second word lines 210.

In an embodiment, as shown in FIG. 1, the plurality of first word lines 110 and the plurality of second word lines 210 are spaced apart from each other in the Y direction. That is, two word lines adjacent to each first word line 110 are second word lines 210, and two word lines adjacent to each second word line 210 are first word lines 110. Compared with the first word lines 110 and the second word lines 210 which are not spaced apart from each other, the present embodiment greatly improves the word line distribution density in the word line structure, thereby reducing the device area occupied by the word line structure in the Y direction, further improving the integration level of a semiconductor device, and reducing the area of the semiconductor device.

In an embodiment, as shown in FIG. 2, the plurality of first word lines 110 have first word line contact structures 111 on a positive side of the X direction. As shown in FIG. 3, the plurality of second word lines 210 have second word line contact structures 211 on a negative side of the X direction. In another embodiment, the plurality of first word lines 110 have first word line contact structures 111 on a negative side of the X direction. The plurality of second word lines 210 have second word line contact structures 211 on a positive side of the X direction. It will be understood that if the first word line contact structure 111 and the second word line contact structure 211 are both disposed on a same side of the corresponding word lines, e.g. both disposed on the positive side in the X direction or the negative side in the X direction, the arrangement space of the word line contact structures will be very limited.

Therefore, in the above-described two embodiments in which the first word line contact structure 111 and the second word line contact structure 211 are respectively disposed on different sides of the corresponding word lines, it is possible to provide a larger arrangement space for each first word line contact structure 111 and each second word line contact structure 211, thereby more effectively reducing the contact resistance of each word line contact structure. Further, based on the word line structure of the present embodiment, the sizes of the first word line contact structure 111 and the second word line contact structure 211 in the Y direction may be 1.2 to 2 times a minimum process size.

In an embodiment, the first word line contact structure 111 and the second word line contact structure 211 have a same cross-sectional area. By arranging the first word line contact structure 111 and the second word line contact structure 211 with the same cross-sectional area, the contact resistance between each word line contact structure and the corresponding word line may be the same. When the contact resistances are the same, current flowing through each word line is the same under the same condition, so that turn-on and turn-off speeds of a switch in each memory cell are consistent with each other, thereby avoiding the performance difference between different memory cells, and improving the reliability of overall performance of the device.

Figure 4:
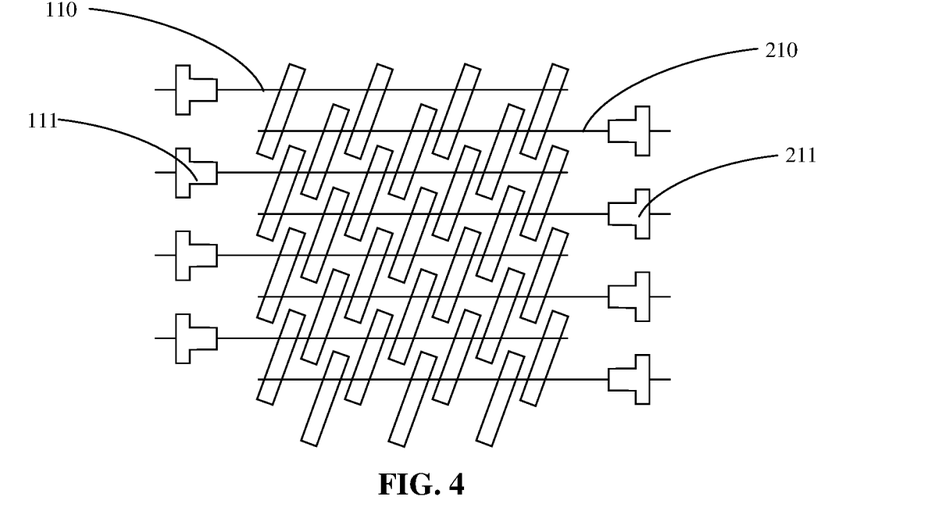
FIG. 4 is a schematic diagram of a T-shaped word line contact structure according to an embodiment.
Figure 5:
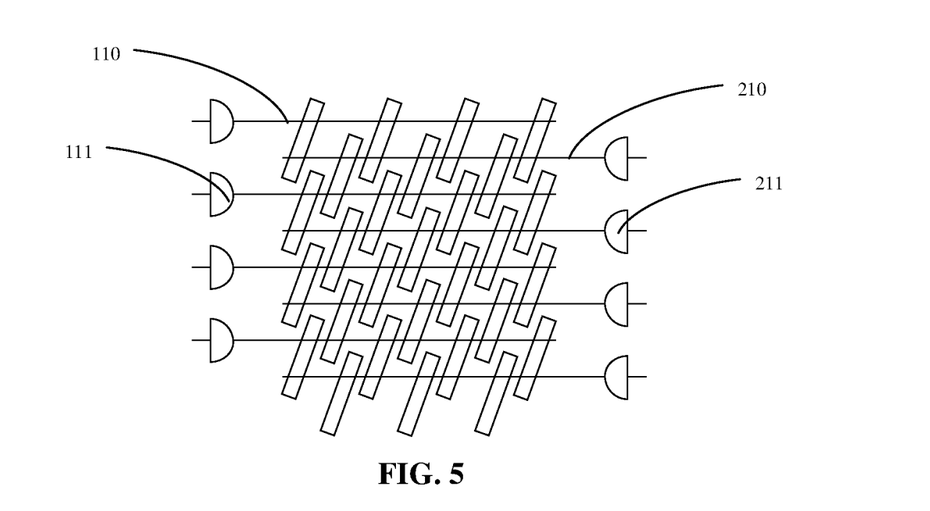
FIG. 5 is a schematic diagram of a semicircular word line contact structure according to an embodiment.

In an embodiment, the first word line contact structure 111 and the second word line contact structure 211 each have a rectangular, T-shaped, or semicircular cross-section. The first word line contact structure 111 and the second word line contact structure 211 in the embodiment of FIG. 1 are rectangular word line contact structures. FIG. 4 is a schematic diagram of a T-shaped word line contact structure according to an embodiment. FIG. 5 is a schematic diagram of a semicircular word line contact structure according to an embodiment. As shown in FIGS. 1, 4, and 5, the first word line contact structure 111 and the second word line contact structure 211 of any cross-sectional shape are suitable for the word line structure. Therefore, the word line contact structures of other cross-sectional shapes not shown in the present embodiment are also within the protection scope of the present embodiment.

Figure 6:
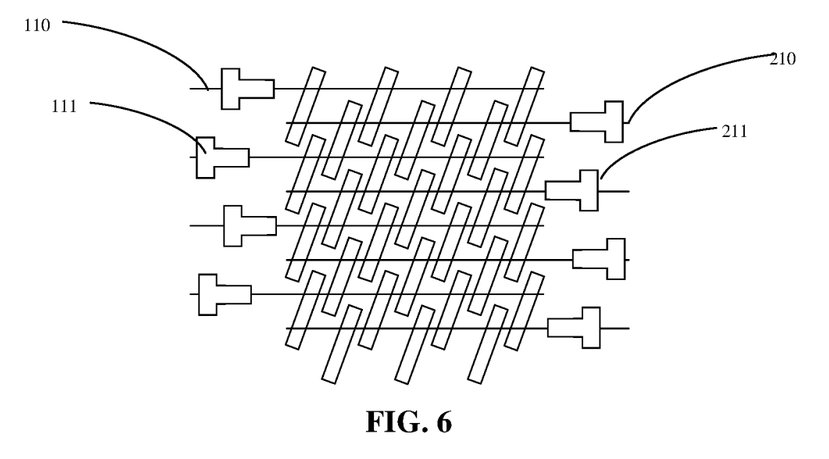
FIG. 6 is a schematic diagram of a word line structure with staggered word line contact structures according to an embodiment.

FIG. 6 is a schematic diagram of a word line structure with staggered word line contact structures according to an embodiment. As shown in FIG. 6, by elongating lengths of the first word lines 110 in the present embodiment, a plurality of first word line contact structures 111 are arranged in a staggered manner, thereby widening the arrangement space of the first word line contact structures 111 in the X direction, increasing the size of the first word line contact structures 111 in the X direction, enlarging the contact area between the first word line contact structure 111 and the corresponding first word line 110, and further reducing the contact resistance. Further, by elongating lengths of the second word lines 210 in the present embodiment, a plurality of second word line contact structures 211 are also arranged in a staggered manner, thereby widening the arrangement space of the second word line contact structures 211 in the X direction, increasing the size of the second word line contact structures 211 in the X direction, and enlarging the contact area between the second word line contact structure 211 and the corresponding first word line 110. It needs to noted that the staggered word line contact structures necessarily cause the word line structure to become larger in size in the X direction, thereby requiring a larger device area to be occupied. Therefore, it is needed to select the appropriate sizes of the first word line contact structure 111 and the second word line contact structure 211 in the X direction to achieve the balance between the contact resistance and the device size.

Figure 7:
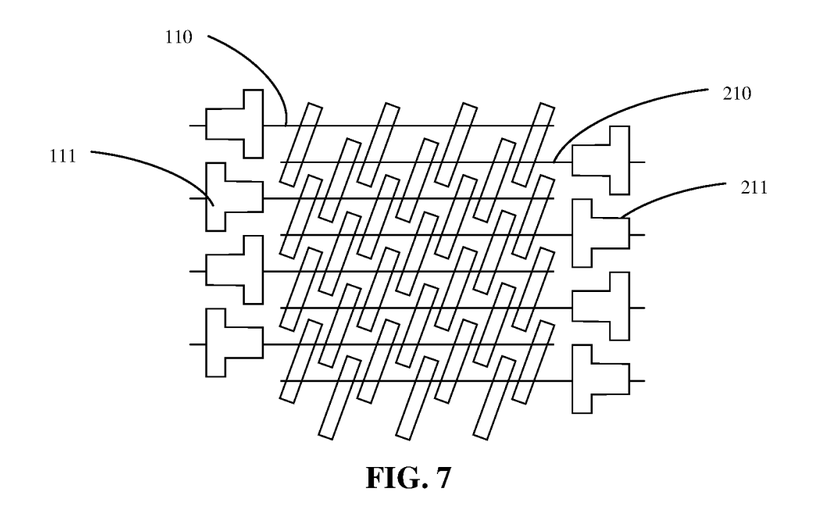
FIG. 7 is a schematic diagram of adjacent word line contact structures having complementary shapes according to an embodiment.
Figure 8:
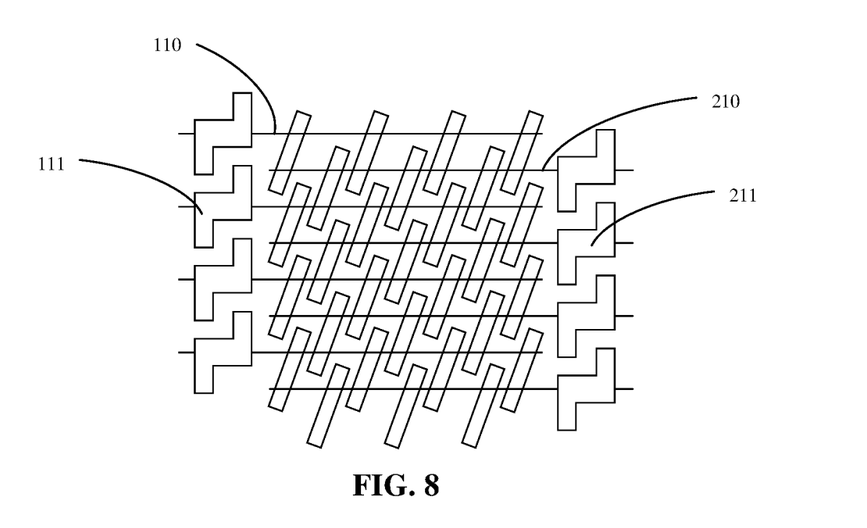
FIG. 8 is a schematic diagram of adjacent word line contact structures having complementary shapes according to another embodiment.

FIG. 7 is a schematic diagram of adjacent word line contact structures having complementary shapes according to an embodiment. In the present embodiment, the first word line contact structures 111 are T-shaped, and adjacent T-shaped first word line contact structures 111 are arranged in opposite directions. As shown in FIG. 7, on the premise that the first word line and the second word line have the same length, a first word line contact structure 111 with a larger cross-sectional area may be achieved in the present embodiment by complementing the shapes of the adjacent T-shaped first word line contact structures 111 to each other. Further, adjacent T-shaped second word line contact structures 211 in the present embodiment are also arranged in opposite directions. It needs be noted that the present embodiment does not specifically define the shapes and arrangement directions of the first word line contact structure 111 and the second word line contact structure 211. Other technical solutions capable of realizing shape complementation of adjacent word line contact structures as shown in FIG. 8 are also within the protection scope of this disclosure.

In an embodiment, an end of each of the first word line contact structure 111 and the second word line contact structure 211 is electrically connected with a gate of a transistor, while an another end is electrically connected with a drive circuit. The drive circuit is used to select word lines to access the memory cell.

Figure 9:
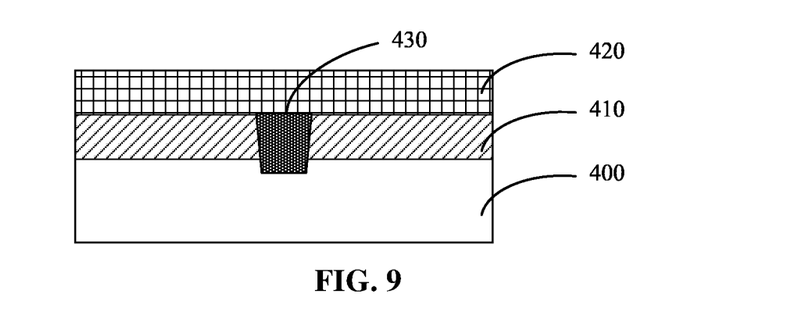
FIG. 9 is a schematic diagram of a grooved contact structure according to an embodiment.

In an embodiment, the first word line contact structure 111 and/or the second word line contact structure 211 are grooved contact structures. FIG. 9 is a schematic diagram of a grooved contact structure according to the present embodiment. As shown in FIG. 9, the grooved contact structure refers to a contact structure 430 formed by etching an interlayer dielectric layer 410, etching a word line 400 with a set depth to form a groove, and filling the groove with a conductive material. As such, the word line 400 is electrically connected with a metal layer 420. By setting the first word line contact structure 111 and/or the second word line contact structure 211 as the grooved contact structures in the present embodiment, the area of the word line contact structure can be reduced while a large contact area is ensured, and a contact and a short circuit between adjacent contact structures are prevented, so that the integration level and reliability of the semiconductor device are improved.

In an embodiment, a material of the first word line contact structure 111 and a material of the second word line contact structure 211 are one or more of tungsten, aluminum, copper, titanium, tantalum, or polysilicon. The above materials have good conductivity, thereby further reducing the contact resistance between the first word line contact structure 111 and the corresponding word line and the contact resistance between the second word line contact structure 211 and the corresponding word line.

Figure 10:
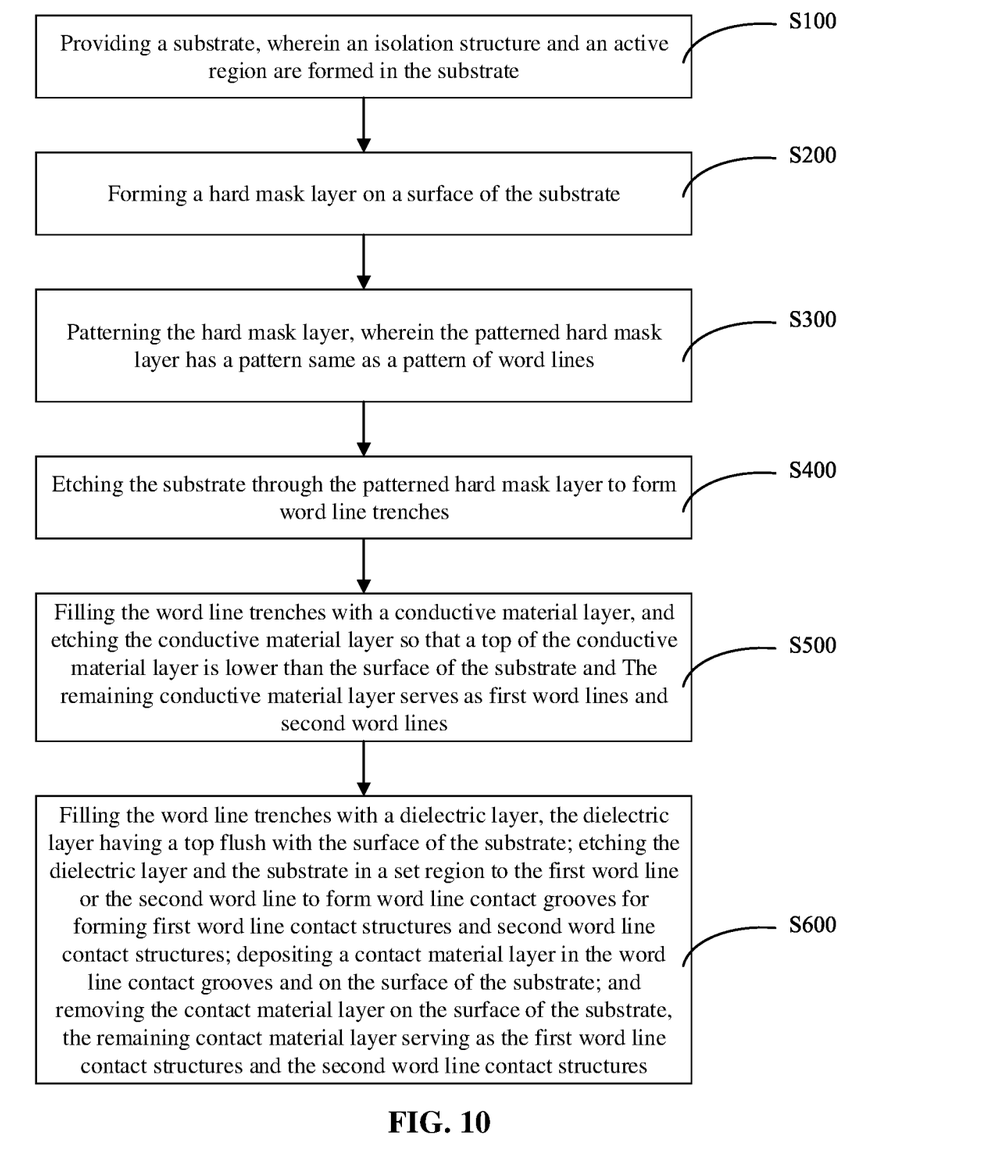
FIG. 10 shows a manufacturing method of a word line structure according to an embodiment.

FIG. 10 shows a manufacturing method of a word line structure according to an embodiment. As shown in FIG. 10, the manufacturing method of a word line structure includes steps S100 to S600.

At S100, a substrate is provided, where an isolation structure and an active region are formed in the substrate.

Specifically, the substrate may be a silicon substrate or a germanium substrate. The isolation structure is formed in the substrate and used to define the active region in the substrate. After the isolation structure is formed, the active region is formed in the substrate by ion implantation.

Alternatively, the isolation structure is a shallow-trench isolation structure. The step of forming the shallow-trench isolation structure is as follows. A trench is etched in the substrate. The trench is filled with a dielectric substance. A wafer surface is planarized by using a chemical mechanical polishing method. Herein, the trench is filled with a dielectric substance by adopting a chemical vapor deposition method and a material of the dielectric substance is such as silicon oxide. The shallow-trench isolation structure has a small surface area, is compatible with a chemical mechanical polishing technology, can be suitable for requirements of smaller line width and higher integration level, and is a better isolation technology. It needs be noted that the isolation structure in the present embodiment is not limited to the shallow-trench isolation structure, and other isolation structures capable of achieving isolation performance are also possible.

At S200, a hard mask layer is formed on a surface of the substrate.

Specifically, a material of the hard mask layer may be at least one of silicon oxide, silicon nitride, silicon carbide, silicon oxynitride, silicon carbonitride, or silicon oxycarbonitride. The hard mask layer is used as a mask for etching of the substrate.

At S300, the hard mask layer is patterned, in which the patterned hard mask layer has a pattern same as a pattern of word lines.

Specifically, the patterned hard mask layer is formed by adopting a Double-Patterning (DP) technology. The DP technology includes, but is not limited to, a Self-Aligned Double-Patterning (SADP) technology, a Litho-Etch-Litho-Etch (LELE) technology, and a Litho-Freeze-Litho (LFL) technology. In the present embodiment, the DP technology is adopted to improve the density of a word line trench and the integration level of a device.

At S400, the substrate is etched through the patterned hard mask layer to form word line trenches.

At S500, the word line trenches are filled with a conductive material layer, and the conductive material layer is etched so that a top of the conductive material layer is lower than the surface of the substrate and the remaining conductive material layer serves as first word lines 110 and second word lines 210.

The plurality of first word lines 110 extend in an X direction. The plurality of first word lines 110 have a same length and are aligned and arranged in a Y direction. The plurality of second word lines 210 extend in the X direction. The plurality of second word lines 210 have a same length and are aligned and arranged in the Y direction. The first word line array 100 and the second word line array 200 are not aligned in the Y direction. The Y direction is perpendicular to the X direction. Alternatively, a material of the conductive material layer is one or more of tungsten, aluminum, titanium, tantalum, titanium nitride, or polysilicon.

At S600, the word line trenches are filled with a dielectric layer, in which the dielectric layer has a top flush with the surface of the substrate; the substrate and the dielectric layer in a set region are etched to the first word line 110 or the second word line 210 to form word line contact grooves for forming first word line contact structures 111 and second word line contact structures 211; a contact material layer is deposited in the word line contact grooves and on the surface of the substrate; the contact material layer on the surface of the substrate is removed, and the remaining contact material layer serves as the first word line contact structures 111 and the second word line contact structures 211.

It is understood that although the various steps in the flowchart of FIG. 10 are shown sequentially as indicated by the arrows, the steps are not necessarily performed sequentially as indicated by the arrows. Unless specifically stated otherwise herein, the steps are not performed in a strict order of limitation, and the steps may be performed in other orders. Moreover, at least a portion of the steps in FIG. 10 may include a plurality of sub-steps or stages that are not necessarily performed at the same time, but may be performed at different times, and the sub-steps or stages may be not necessarily performed sequentially, but may be performed in turn or alternately with at least a portion of other steps or the sub-steps or stages of other steps.

In an embodiment, a semiconductor memory is also provided, which includes:

a word line structure as described above; and a memory cell, including a memory capacitor and a transistor, where a gate of the transistor is connected to a word line, a drain of the transistor is connected to a bit line, and a source of the transistor is connected to the memory capacitor.

A plurality of memory cells are arranged in an array consisting of M rows and N columns. The memory cells in a same row share one word line. The memory cells in a same column share one bit line. The word line has the word line structure. Both M and N are positive integers.

The semiconductor memory of the present embodiment is based on the first word line array 100 and the second word line array 200 which are not aligned in the Y direction. The cross-sectional areas of the first word line contact structure 111 and the second word line contact structure 211 are enlarged by providing a larger arrangement space in a horizontal plane for the first word line contact structure 111 and the second word line contact structure 211. Therefore, the contact resistance between the first word line contact structure 111 and the corresponding word line and the contact resistance between the second word line contact structure 211 and the corresponding word line are reduced, and the turn-on and turn-off speed of a switch in the memory cell of the semiconductor memory is improved.

In the description of the disclosure, it needs to be understood that the terms "upper", "lower", "vertical", "horizontal", "inner", "outer", etc. indicate orientations or positional relationships based on that shown in the drawings. They are merely intended to facilitate describing the disclosure and to simplify the description rather than indicating or implying that the referenced device or element must have a particular orientation and be constructed and operated in a particular orientation, and are thus not to be construed as limiting the disclosure.

The technical features of the above-described embodiments may be combined arbitrarily. In order to simplify the description, not all of possible combinations of the technical features in the above embodiments are described. However, as long as there is no conflict between these technical features, they should be considered to be within the scope of this specification.

The above embodiments describe only a few implementations of the disclosure, and are described specifically and in detail, but cannot therefore be construed to limit the patent scope of the disclosure. It is noted that those of ordinary skill in the art may further make several variations and improvements without departing from the conception of the disclosure, which fall within the protection scope of the disclosure. Therefore, the patent protection scope of the disclosure should be determined by the appended claims.

The invention claimed is:

1. A word line structure, comprising:

a first word line array, comprising a plurality of first word lines extending in an X direction, the plurality of first word lines having a same length and being aligned and arranged in a Y direction; and a second word line array, comprising a plurality of second word lines extending in the X direction, the plurality of second word lines having a same length and being aligned and arranged in the Y direction, wherein the first word line array and the second word line array are not aligned in the Y direction, and the Y direction is perpendicular to the X direction; and, wherein the plurality of first word lines have first word line contact structures on a positive side of an X-axis, wherein the X direction extends along the X-axis, and the plurality of second word lines have second word line contact structures on a negative side of the X-axis, wherein the X direction extends along the X-axis; or the plurality of first word lines have first word line contact structures on a negative side of the X-axis, wherein the X direction extends along the X-axis, and the plurality of second word lines have second word line contact structures on a positive side of the X-axis, wherein the X direction extends along the X-axis; and the first word line contact structures and the second word line contact structures each have a T-shaped cross-section, the T-shaped cross-section parallel to the X direction and the Y directions, adjacent T-shaped first word line contact structures in the Y direction are arranged in opposite directions, adjacent T-shaped second word line contact structures in the Y direction are arranged in opposite directions.

2. The word line structure of claim 1, wherein the plurality of first word lines are equidistantly arranged at a set interval in the Y direction, and the plurality of second word lines are equidistantly arranged at a set interval in the Y direction.

3. The word line structure of claim 2, wherein the plurality of first word lines and the plurality of second word lines are spaced apart from each other in the Y direction.

4. The word line structure of claim 3, wherein the first word line contact structures and the second word line contact structures have a same cross-sectional area.

5. The word line structure of claim 3, wherein an end of each of the plurality of first word line contact structures and an end of each of the plurality of second word line contact structures are electrically connected with a gate of a transistor and an another end of each of the plurality of first word line contact structures and an another end of each of the plurality of second word line contact structures are electrically connected with a drive circuit.

6. The word line structure of claim 3, wherein at least one of the plurality of first word line contact structures and the plurality of second word line contact structures is a grooved contact structure.

7. The word line structure of claim 3, wherein a material of the plurality of first word line contact structures and a material of the plurality of second word line contact structures each are one or more of tungsten, aluminum, copper, titanium, tantalum, or polysilicon.

8. The word line structure of claim 1, wherein the first word line contact structures are arranged in a staggered manner, the second word line contact structures are also arranged in a staggered manner.

9. The word line structure of claim 8, wherein the adjacent T-shaped first word line contact structures have complementary shapes, the adjacent T-shaped second word line contact structures have complementary shapes.

10. A semiconductor memory, comprising:
a word line structure comprising:
a first word line array, comprising a plurality of first word lines extending in an X direction, the plurality of first word lines having a same length and being aligned and arranged in a Y direction; and
a second word line array, comprising a plurality of second word lines extending in the X direction, the plurality of second word lines having a same length and being aligned and arranged in the Y direction,
wherein the first word line array and the second word line array are not aligned in the Y direction, and the Y direction is perpendicular to the X direction; and
a memory cell, comprising a memory capacitor and a transistor, a gate of the transistor being connected to a word line, a drain of the transistor being connected to a bit line, and a source of the transistor being connected to the memory capacitor,
wherein a plurality of memory cells are arranged in an array consisting of M rows and N columns, the memory cells in a same row share one word line, the memory cells in a same column share one bit line, the word line has the word line structure, and both M and N are positive integers; and, wherein
the plurality of first word lines have first word line contact structures on a positive side of an X-axis, wherein the X direction extends along the X-axis, and the plurality of second word lines have second word line contact structures on a negative side of the X-axis, wherein the X direction extends along the X-axis; or
the plurality of first word lines have first word line contact structures on a negative side of the X-axis, wherein the X direction extends along the X-axis, and the plurality of second word lines have second word line contact structures on a positive side of the X-axis, wherein the X direction extends along the X-axis; and
the first word line contact structures and the second word line contact structures each have a T-shaped cross-section, the T-shaped cross-section parallel to the X direction and the Y directions, adjacent T-shaped first word line contact structures in the Y direction are arranged in opposite directions, adjacent T-shaped second word line contact structures in the Y direction are arranged in opposite directions.

11. A manufacturing method of a word line structure, comprising:
providing a substrate, an isolation structure and an active region being formed in the substrate;
forming a hard mask layer on a surface of the substrate;
patterning the hard mask layer, wherein the patterned hard mask layer has a pattern same as a pattern of word lines;
etching the substrate through the patterned hard mask layer to form word line trenches;
filling the word line trenches with a conductive material layer, and etching the conductive material layer so that a top of the conductive material layer is lower than the surface of the substrate and the remaining conductive material layer serves as first word lines and second word lines; and
filling the word line trenches with a dielectric layer, the dielectric layer having a top flush surface with the surface of the substrate; etching the dielectric layer and the substrate in a set region to the first word line or the second word line to form word line contact grooves for forming first word line contact structures and second word line contact structures; depositing a contact material layer in the first word line contact groove and the second word line contact groove and on the surface of the substrate; and removing the contact material layer on the surface of the substrate, the remaining contact material layer serving as the first word line contact structures and the second word line contact structures; and, wherein the plurality of first word lines have first word line contact structures on a positive side of an X-axis, wherein the X direction extends along the X-axis, and the plurality of second word lines have second word line contact structures on a negative side of the X-axis, wherein the X direction extends along the X-axis; or the plurality of first word lines have first word line contact structures on a negative side of the X-axis, wherein the X direction extends along the X-axis, and the plurality of second word lines have second word line contact structures on a positive side of the X-axis, wherein the X direction extends along the X-axis; and the first word line contact structures and the second word line contact structures each have a T-shaped cross-section, the T-shaped cross-section parallel to the X direction and the Y directions, adjacent T-shaped first word line contact structures in the Y direction are arranged in opposite directions, adjacent T-shaped second word line contact structures in the Y direction are arranged in opposite directions.

12. The method of claim 11, wherein the forming the isolation structure comprises:
etching a trench in the substrate;
filling the trench with a dielectric substance; and
planarizing a wafer surface by using a chemical mechanical polishing method.

13. The method of claim 11, wherein a material of the hard mask layer is at least one of silicon oxide, silicon nitride, silicon carbide, silicon oxynitride, silicon carbonitride, or silicon oxycarbonitride.

14. The method of claim 11, wherein a plurality of first word lines extend in an X direction, have a same length, and are aligned and arranged in a Y direction, and a plurality of second word lines extend in the X direction, have a same length, and are aligned and arranged in the Y direction, and wherein a first word line array and a second word line array are not aligned in the Y direction, and the Y direction is perpendicular to the X direction.

15. The method of claim 11, wherein a material of the conductive material layer is one or more of tungsten, aluminum, titanium, tantalum, titanium nitride, or polysilicon.

* * * * *